United States Patent
Bhyravabhotla

(10) Patent No.: US 7,933,804 B2
(45) Date of Patent: Apr. 26, 2011

(54) METHODS AND APPARATUS FOR SELF-DIAGNOSING ELECTRONIC PRICE LABELS

(75) Inventor: Raghurama Bhyravabhotla, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 938 days.

(21) Appl. No.: 11/338,925

(22) Filed: Jan. 24, 2006

(65) Prior Publication Data

US 2006/0122887 A1    Jun. 8, 2006

Related U.S. Application Data

(63) Continuation of application No. 09/450,551, filed on Nov. 30, 1999, now Pat. No. 7,026,913.

(51) Int. Cl.
G06Q 20/00 (2006.01)
G08C 19/00 (2006.01)

(52) U.S. Cl. .......................................... 705/20; 340/5.91

(58) Field of Classification Search ................ 705/20; 340/5.91
See application file for complete search history.

(56) References Cited

U.S. PATENT DOCUMENTS

| 4,821,291 | A | * | 4/1989 | Stevens et al. ................. 375/259 |
| 5,504,475 | A | * | 4/1996 | Houdou et al. ............... 340/5.91 |
| 5,572,653 | A | * | 11/1996 | DeTemple et al. ............. 345/501 |
| 5,736,967 | A | * | 4/1998 | Kayser et al. .................. 345/2.1 |
| 5,910,653 | A | * | 6/1999 | Campo .................... 250/214 AL |
| 6,043,751 | A | * | 3/2000 | Goodwin, III ................ 340/540 |
| 6,044,359 | A | * | 3/2000 | Goodwin, III ............. 340/10.34 |
| 6,293,463 | B1 | * | 9/2001 | Kato et al. ..................... 235/383 |
| 6,307,919 | B1 | * | 10/2001 | Yoked ........................... 235/385 |
| 6,411,196 | B1 | * | 6/2002 | Bhyravabhotla ............. 340/5.91 |
| 7,026,913 | B2 | * | 4/2006 | Bhyravabhotla ............. 340/5.91 |
| 7,287,001 | B1 | * | 10/2007 | Falls et al. ....................... 705/22 |

FOREIGN PATENT DOCUMENTS

EP    917125 A1  *  5/1999

* cited by examiner

*Primary Examiner* — Elaine Gort
*Assistant Examiner* — Ashford Hayles
(74) *Attorney, Agent, or Firm* — Peter Priest; Paul Martin

(57) ABSTRACT

A self-diagnosing electronic price label. The label communicates with a central processor in order to receive price information for display and to report the status of the label to the central processor. The label periodically runs a self-test program to verify proper operation of its components. If a component fails the self-test, the failure is reported to a central processor, and the central processor reports the failure for investigation. During normal operation, the label issues a signal to the central processor indicating normal operation. In the event of a failure, the label ceases to send the signal indicating normal operation. When the signal is not received as expected, the central processor reports the failure to receive the signal for investigation. This allows the central processor to be alerted to failures which disable communication between the label and the central processor.

18 Claims, 5 Drawing Sheets

FIG. 5

| Test | Purpose | Method |
|---|---|---|
| 502 — Battery level test | Test battery voltage | Query battery low detector |
| 504 — Stuck button test | Test pushbutton | Check for rapid change in register selected for display |
| 506 — Checksum test | Test displayed price and/or information | Compare display price with checksum |
| 508 — LCD glass test | Test display glass | Query circuitry for LCD status |
| 510 — Circuitry test | Test EPL circuitry | Query EPL circuitry and obtain return signal |

FIG. 6

| Monitored Fault | Monitoring Action | Reported Recommendation |
|---|---|---|
| 602 — EPL battery voltage low | Perform EPL battery level test | Replace battery or EPL if level is too low |
| 604 — Pushbutton stuck | Perform stuck button test | Attempt to free stuck pushbutton and replace EPL if this fails |
| 606 — Incorrect data displayed | Perform checksum test | Retransmit data and replace EPL if this fails to correct the fault |
| 608 — EPL display faulty | Perform EPL LCD glass test | Replace EPL |
| 610 — EPL circuitry faulty | Perform EPL circuitry test | Replace EPL |

METHODS AND APPARATUS FOR SELF-DIAGNOSING ELECTRONIC PRICE LABELS

The present application is a continuation of U.S. application Ser. No. 09/450,551, filed Nov. 30, 1999, which is incorporated herein in its entirety.

FIELD OF THE INVENTION

The present invention relates generally to electronic price labels. More particularly, the invention relates to methods and apparatus for automatic self-diagnosis of faults in electronic price labels.

BACKGROUND OF THE INVENTION

Electronic price labels provide numerous advantages in retailing and are growing in popularity. An electronic price label provides a superior substitute for a paper shelf label, and displays pricing and other information for a category of products, such as a size and brand of detergent or the like, suitably placed on a shelf in the vicinity of the label and available for purchase. In contrast to a paper label, which displays a fixed price and which must be individually changed whenever the price of a product is changed, an electronic price label can receive price information from a central database over a wire or through radio signals. An electronic price label is easy to update. Whenever a price change is desired, updated price information can be transmitted to every affected price label in a retail establishment. This is much faster and more convenient than changing paper labels, which must be changed or replaced individually, at considerable cost of time and labor.

While electronic labels are more versatile and more easily updated than are paper labels, they share a drawback common to many mechanical and electronic devices, in that they are subject to faults and breakdowns. An electronic price label which fails may provide incorrect price information, or no price information at all, and if the label fails without issuing an alert, it may continue in the failed condition for an indefinite length of time. If price labels are subject to failure without issuing an alert and it is desired to prevent labels from remaining in a failed condition, it is necessary to devote resources to performing periodic checks of each label. In establishments using a large number of labels, it will be necessary to perform relatively frequent checks, because the large number of labels in use will render it more probable that at least one label has failed. Because failures in electronic devices are difficult to predict, it would be advisable, in the absence of an automatic diagnostic or alert mechanism, to examine every label during every examination.

There exists, therefore, a need in the art for a self-diagnostic electronic price label adapted to automatically detect and report a fault.

SUMMARY OF THE INVENTION

An electronic price label according to the present invention performs periodic self-diagnosis for faults and reports detected faults through a visual display or audible tone, or alternatively to a central reporting system. During normal operation, the price label periodically issues a "normal operation" signal. If the central reporting system fails to detect the "normal operation" signal during a predetermined time interval, the label is presumed to be faulty and an investigation is performed. The price label includes a processor which controls normal operation for the label, and which also runs a diagnostic program at periodic intervals. The processor, under control of the diagnostic program, exercises each component of the electronic price label and receives responses from the components. The processor then compares the responses received against fault signatures and reports as a failure any response matching a fault signature.

A more complete understanding of the present invention, as well as further features and advantages of the invention, will be apparent from the following Detailed Description and the accompanying drawings.

BRIEF DESCRIPTION OF THE DRAWINGS

FIG. 5 illustrates tests performed by a self-diagnosing electronic price label according to the present invention; and FIG. 6 illustrates faults diagnosed by a self-diagnosing electronic price label according to the present invention.

DETAILED DESCRIPTION

Figure 1:
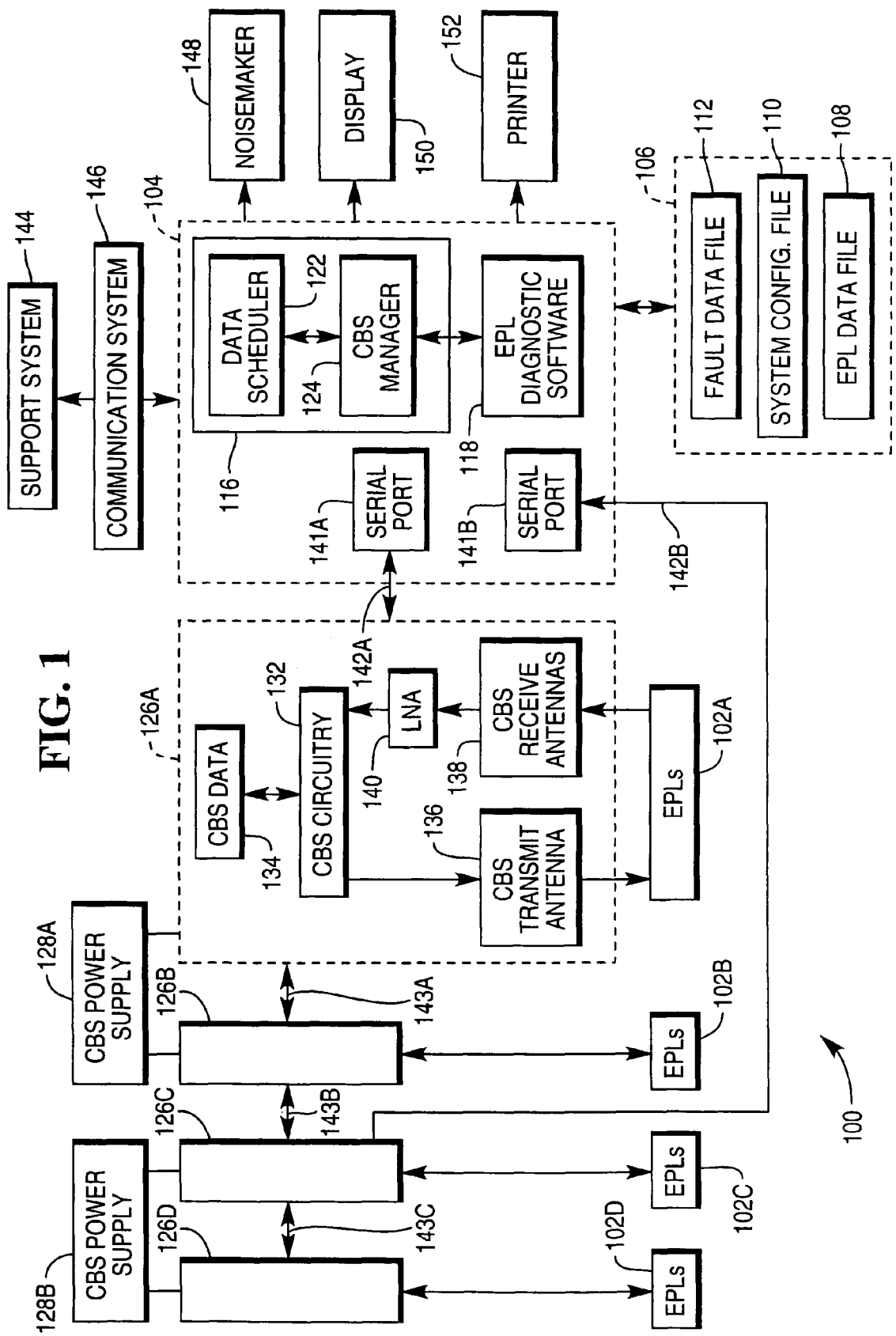
FIG. 1 illustrates a retail price display system employing a self-diagnosing electronic price label according to the present invention.

FIG. 1 illustrates a retail price display system 100 including a plurality of self-diagnosing electronic price labels, shown here in groups 102A-102D, according to the present invention. The system 100 includes a central processor 104 having access to a storage system 106, which is preferably a fixed disk drive. The storage system 106 maintains one or more databases such as a electronic price label data file 108, a system configuration file 110 and a fault data file 112. The electronic price label data file 108, includes product information, identification information, product price verifier information, and status information for each of the electronic price labels in groups 102A through 102D. The central processor 104 executes electronic price label control software 116 and price display system diagnostic software 118. The diagnostic software 120 monitors the price display system 100 for failures and manages reporting of failures. The control software 116 includes a data scheduler 122 and a communication base station manager 124.

Under control of the communication base station manager 124, the central processor 104 communicates with a plurality of communication base stations (CBSs) shown here as first through fourth CBSs 126A, 126B 126C and 126D, respectively. The CBSs 126A through 126D provide a communication interface with the labels in groups 102A through 102D. First and second CBSs 126A and 126B receive power from a first CBS power supply 128A, while the third and fourth CBSs 126C and 126D receive power from a second CBS power supply 128B. Each of the first through fourth CBSs 126A through 126D communicates with a plurality of the labels in groups 102A through 102D, respectively.

Internal details of the CBS 126A are shown. For simplicity, the internal details of CBS 126B through 126D are not shown, but CBSs 126B through 126D have similar internal details to those of CBS 126A.

CBS 126A includes internal control circuitry 132, for accessing storage 134. The storage 134 includes data and instructions to be transmitted to the electronic price labels, as well as to be used in the operation of the CBS 126A. The CBS 126A also includes a transmit antenna 136 and up to four receive antennas 138. In order to allow for better processing of the signals received by the receive antennas 138, the CBS 126A includes a low noise amplifier 140. The low noise amplifier 140 amplifies each signal received by the receive antennas 138 and passes the signals to the CBS control circuitry 132. When a signal is received, the control circuitry 132 interprets the signal and passes information represented by the signal to the central processor 104.

CBS 126A is preferably a master CBS with the CBSs 126B through 126D being slave CBSs. CBS 126A, therefore, communicates with the central processor 104 and controls the operation of the CBSs 126B through 126D based on the commands received from the processor 104. Any of the CBSs 126A through 126D may be designated as the master, with the others being the slaves. The central processor 104 includes serial ports 141A and 141B for communication with the CBS 126A and CBS 126C, respectively. The CBS 126A is connected to the central port 141A by a first cable 142A and the CBS 126C is connected to the serial port 141B by a second cable 142B. The CBSs 126A through 126D are connected in series by cables 143A-143C.

Each of CBSs 126A through 126D controls operation of its assigned electronic price labels based on the instructions issued by the central processor 104. Each CBS transmits price changes and other commands to its electronic price labels and receives status messages from its electronic price labels.

The price display system 100 performs fault detection on the various components by generating a status request in the central processor 104 and transmitting the status request to the various components within the system 100, including the CBSs 126A through 126D and the electronic price labels in groups 102A through 102D. When a failure response to a status request is received from a component, the central processor logs the failure and transmits the information to a support system 144, via a communication system 146. The central processor 104 may also provide an audible alert through a noisemaker 148 and a visual alert through a central display 150, and may also print the fault or other status information using a printer 152.

The most numerous components in the display system 100 are the groups of electronic price labels 102A through 102D. In a typical store operation, thousands of electronic price labels may be employed. Therefore, the price labels in groups 102A through 102D according to the present invention advantageously include a self-diagnostic feature. The labels are adapted to perform self-diagnosis and provide an alert without waiting for a status request.

Figure 2:
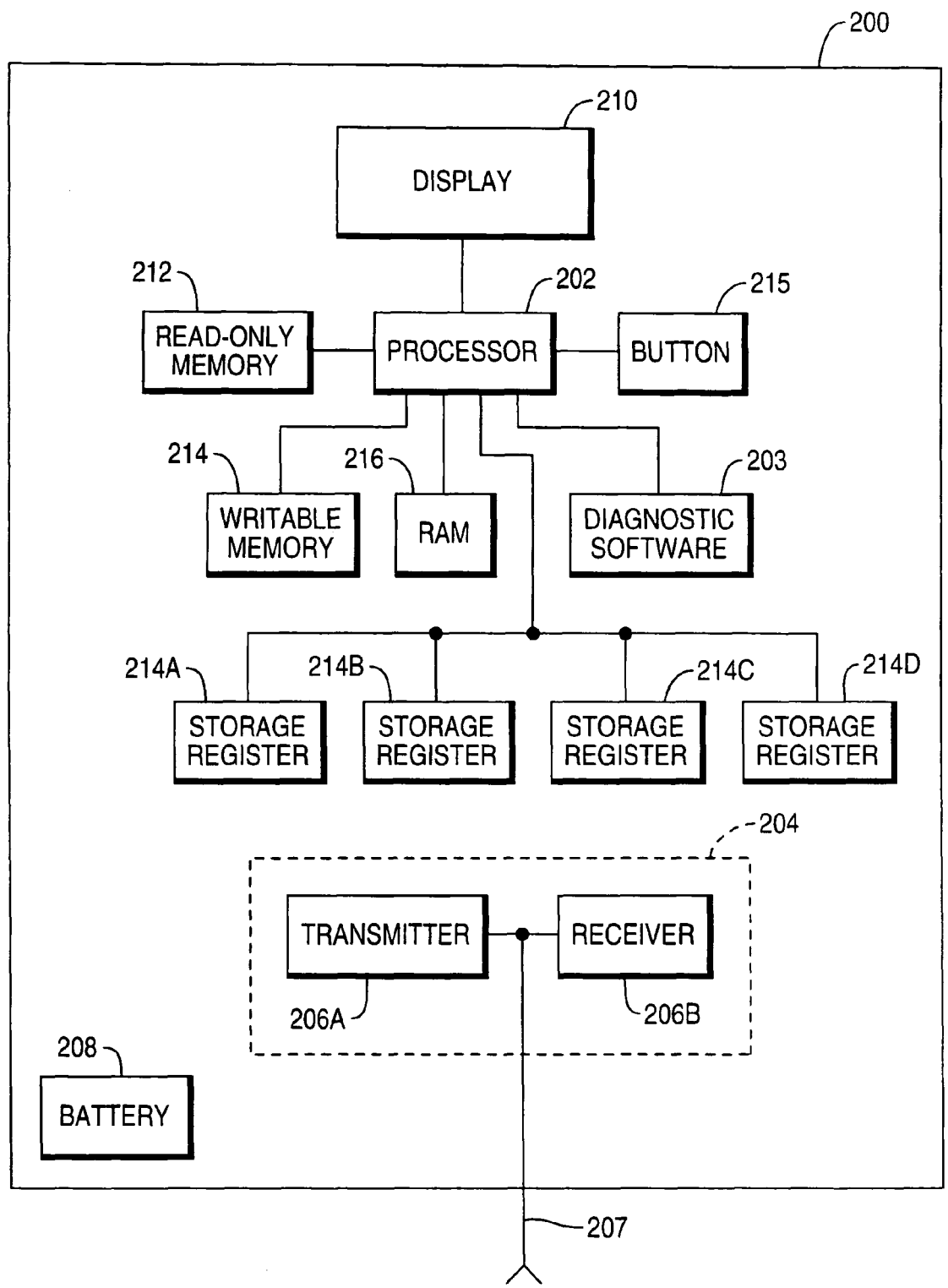
FIG. 2 illustrates details of a self-diagnosing electronic price label according to the present invention.

FIG. 2 illustrates a self-diagnosing electronic price label 200 according to the present invention, suitable for use as one of the electronic price labels in groups 102A through 102D of FIG. 1. The label 200 includes a label processor 202, which may suitably be implemented as a digital signal processor, and a communications interface 204 for communicating with a communication base station such as the communication base station 114A. The communications interface 204 includes a transmitter 206A and a receiver 206B, as well as an antenna 207. The price label 200 includes various other electronic components, including a battery 208, and display 210. The label 200 further includes read-only memory 212 for permanent storage of instructions and other data, as well as writable memory such as flash memory 214, for storage of data which does not change frequently. The label 200 may suitably store several different data items in memory registers 214A-214D, which may be portions of the flash memory 214. The memory registers 214A-214D are subject to testing for content as well as proper operation. A pushbutton 215 is provided whereby a customer may direct the processor 202 to select the contents of any one of the registers 214A-214D for display. Repeated presses of the pushbutton 215 cycle between the different registers 214A-214D. The label 200 also includes volatile memory 216. The volatile memory 216 is used for short-term data storage in performing the normal operations of the electronic price label 200.

The processor 202 performs operations in response to status requests from a central processor such as the processor 104 of FIG. 1. The status requests are received from a communication base station through the communications interface 204. When a status request is received, the processor 202 performs the operations directed by the status request and returns response information to the communication base station. The communication base station returns the response information to the central processor 104.

In addition to responding to status requests, the label 200 performs automated, unsolicited self-diagnosis. In order to provide for automated fault detection for the label 200, the processor 202 executes internal electronic price label diagnostic software 203. Under the control of the diagnostic software 203, the processor 202 performs self-diagnosis, and also furnishes test signals to the other electronic components within the label 200. Upon receiving a test signal, an electronic component returns signals to the processor 202. The processor 202 receives the signals and analyzes the signals to determine if they reflect a fault. Upon identifying a fault, the processor 202 orders the display 208 to report the faulty condition, and also directs the transmitter 206A to report the fault. Some faults, such as a low or dead battery, call for a replacement of the specific component rather than the entire label. If the pushbutton 216 is stuck, it may be necessary only to press the pushbutton 216 in order to free it. Therefore, the processor 202 performs fault isolation sufficient to identify if the fault exists in a replaceable component or if the fault indicates a easily correctable condition and, if so, to identify the affected component. Once the fault is identified, and isolated if appropriate, the processor 202 reports the fault using the display 208 and the transmitter 206A, as desired.

If the transmitter 206A has completely failed, it will be unable to directly report the fault. For this reason, the processor 202 may be advantageously programmed to send to the central processor 104 periodic signals which indicate normal operation. The absence of these signals will indicate a faulty condition which can then be investigated. In this way a failure of the transmitter 206A can be detected without undue delay.

When a test of the label 200 is to be run, the processor 202 first performs a self-test for proper operation. The processor 202 then tests the battery 208 for a low battery condition, the display 210 for correct operation, the memory 212, 214 and 216 for proper operation, and the transmitter 206A and receiver 206B for proper operation. The processor 202 also tests the memory registers 214A-214D for proper operation and for correct content. If the test detects a fault and the transmitter 206A is operating sufficiently to report the fault, the processor 202 orders the transmitter 206A to report the fault to the central processor 104. The processor 202 also directs the display 210 to display the faulty condition and also to stop transmission of the normal operation signal.

In order to reduce cost and complexity, it may be desired to design the label 200 as a passive device. In this case, the transmitter 206A would not be present and the label 200 would not independently transmit status reports and other messages to the central processor 104, but instead would only send signals in response to status requests from the central processor 104. In this case, the label 200 would not transmit a normal operation signal to the central processor 104, and would not transmit a failure signal in the absence of a status request. In case of a test failure, the label 200 would display a local visual and audible error message in order to indicate a need for repair.

Figure 3:
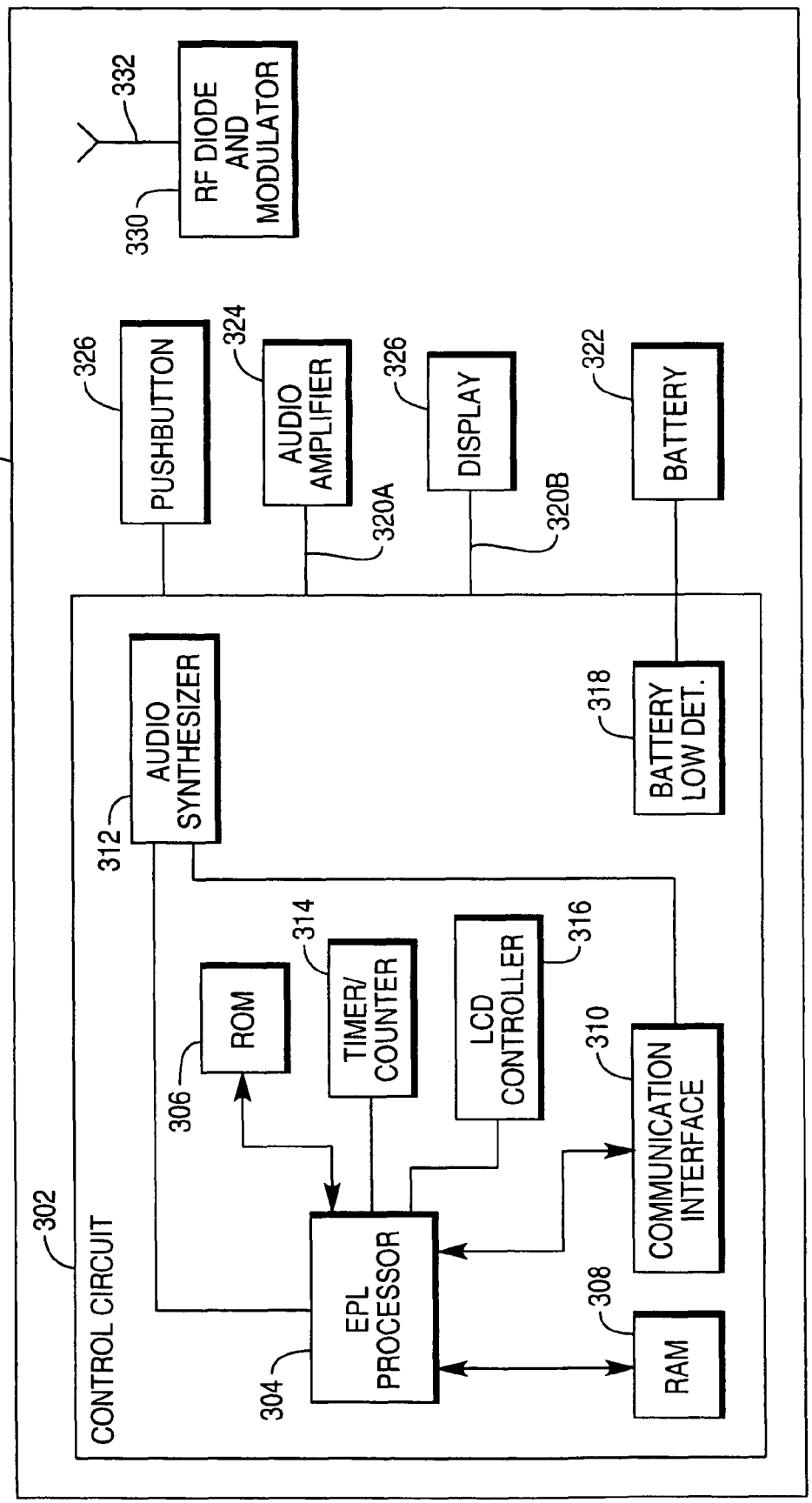
FIG. 3 illustrates additional details of a self-diagnosing electronic price label according to the present invention.

FIG. 3 illustrates in greater detail an electronic price label 300 according to the present invention, which may suitably be employed as one of the electronic price labels in groups 102A through 102D. The label 300 includes a control circuit 302, which may suitably be implemented as a single integrated circuit. The control circuit 302 includes an EPL processor 304, read-only memory 306, volatile memory 308, a communications interface 310, an audio synthesizer 312, a timer/counter circuit 314, an LCD controller/driver 316, a battery low detector 318, and a plurality of input/output ports, shown here as first port 320A and second port 320B. The label 300 also includes a battery 322, an audio amplifier 324, a pushbutton 326, LCD display 328, radio frequency (RF) diode and modulator 330 and antenna 332.

The label 300 receives signals from a central processor such as the central processor 104 of FIG. 1 by way of the antenna 332. The signals from the antenna 332 are processed by the radio frequency diode and modulator 330 and passed to the control circuit 302. The communications interface 310 within the control circuit 302 interprets and processes the signals to obtain the transmitted data and passes the data to the EPL processor 304.

In addition to receiving data from the central processor, the label 300 also provides data such as status information and other information to a central processor such as the central processor 104 of FIG. 1. The EPL processor 304 relays data to the communications interface 310, which produces a signal which is then relayed to the diode and modulator 330 and from there to the antenna 332, which sends the signal to the central processor 104.

The label 300 may periodically receive status requests from the central processor 104. When the label 300 receives a status request, the label 300 performs functions as directed by the status request and returns a resulting signal to the central processor. The central processor 104 then interprets the received signal to determine the functioning of the label 300 and the existence of faults. If no response is received by the central processor 104, the lack of response acts as an indication that the label should be examined or replaced.

In addition to responding to status requests, the label 300 performs periodic self-diagnosis and the EPL processor 304 periodically runs a self-test on the control circuit 302 and on the other components within the label 300. As part of the self-test, the EPL processor 304 verifies the contents of the volatile memory 308 by receiving expected memory content from the central processor 104 and comparing the contents of the volatile memory data received from the central processor 104.

Under ordinary circumstances, a failure is displayed on the LCD display 328 and relayed to the central processor using the communications interface 310. However, in some cases a failure will disable the label 300 from reporting a failure. This will happen, for example, during a total failure of the control circuit 302 or a failure of the components used to communicate with the central processor. If the central processor 104 is transmitting status requests to the label 300, a failure of the label 300 to respond to a status request will provide indication of a failure. However, if it is not desired to transmit status requests to the label, the label 300 may be programmed to periodically transmit a signal to the central processor indicating normal operation. If a failure occurs which interrupts communication, this signal will not be received and the central processor will be alerted that the label should be investigated. In addition, the control circuit 302 orders the display 328 to display an error message whenever a component fails the self-test. This enables the label 300 to report a fault in a way which is relatively easy to detect, even when communication with the central processor is disabled.

In order to reduce cost and complexity, it may be desired to design the label 300 as a passive device. In this case, the label would not independently transmit status reports and other messages to the central processor 104, but instead would only send signals in response to status requests from the central processor 104. In this case, the label 300 would not transmit a normal operation signal to the central processor 104, and would not transmit a failure signal in the absence of a status request. In case of a test failure, the label 300 would display a local visual and audible error message in order to indicate a need for repair.

Figure 4:
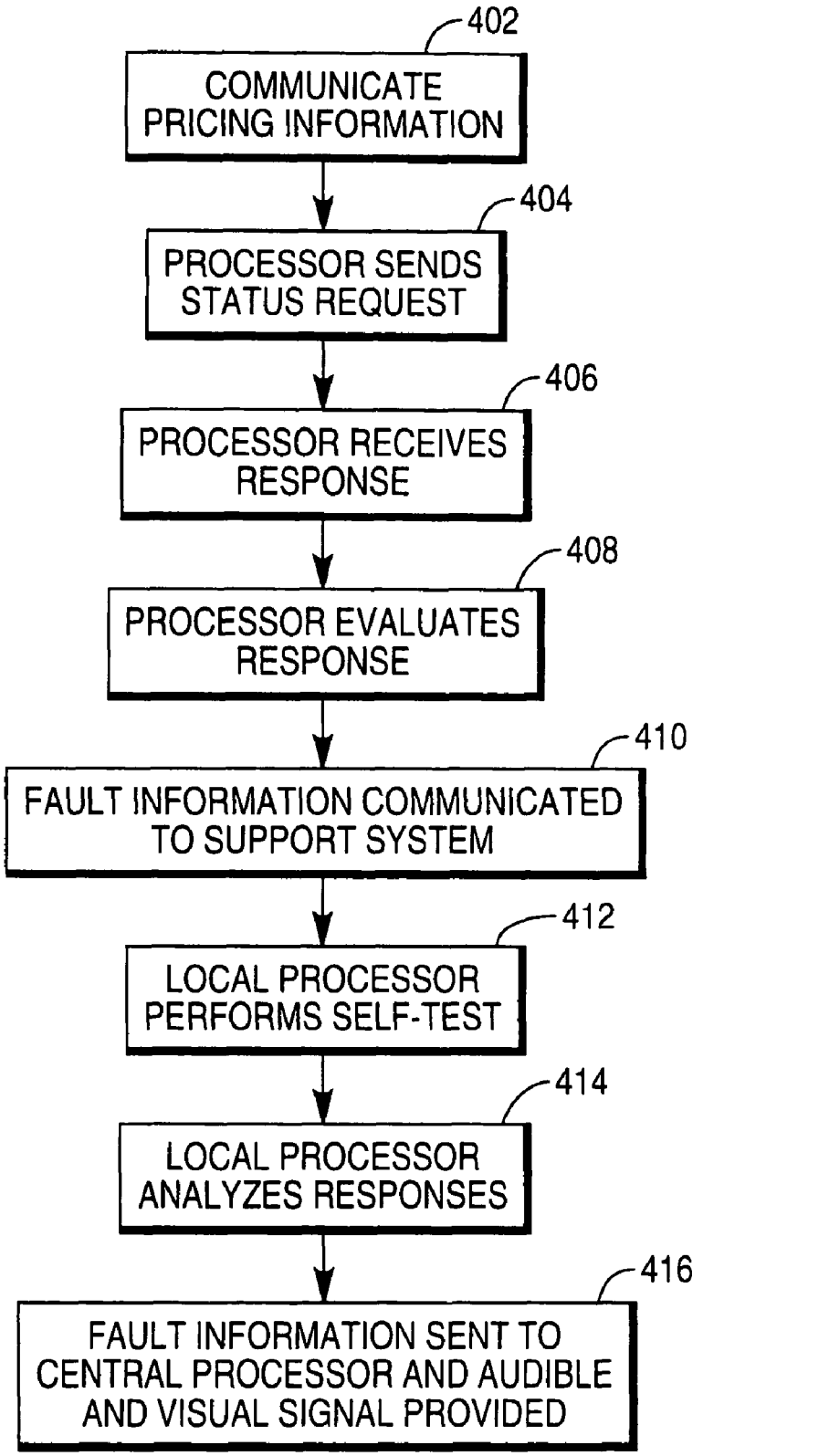
FIG. 4 illustrates a method of operation for an retail price display system employing an electronic price label according to the present invention.

FIG. 4 illustrates a method 400 of operation of a retail price display system employing self-diagnosing electronic price labels according to the present invention. At step 402, a central processor communicates pricing information to a plurality of electronic price labels. The price labels may suitably be similar to the labels of groups 102A through 102D of FIG. 1 and the central processor may be similar to the processor 104 of FIG. 1. Communication may suitably be accomplished through communication base stations such as the base stations 114A-114D of FIG. 1. At step 404, the processor sends a status request to one or more of the price labels. At step 406, the processor receives response signals in response to the status request. At step 408, the processor evaluates the response signals to determine if the signals indicate a fault and to determine the identity of any faults detected. At step 410, the processor communicates the fault information to a support system. Next, at step 412, a local processor of one or more of the electronic price labels performs a self-diagnostic for the label. The local processor sends test signals to each component of the label under test and receives return signals from the components. At step 414, the return signals are analyzed by the local processor to determine if a fault is indicated and further to determine the identity of any faults detected. Finally, at step 416, the local processor provides a visual and audible failure alert, and additionally transmits the fault information to the central processor which then reports the fault information to a support system.

FIG. 5 shows a table 500 including exemplary tests which may be performed on electronic price labels such as the labels in groups 102A through 102D. Tests include a low battery test 502, a stuck button test 504, a checksum test 506, an LCD glass test 508, and a circuitry test 512.

FIG. 6 shows a table 600 including exemplary faults 602-610 which may be monitored and reported by self-diagnosing electronic price labels such as the labels in groups 102A through 102D. Faults include low battery 602, stuck button 604, incorrect price data 606, broken LCD glass 608, and faulty electronic price label circuitry 610.

While the present invention is disclosed in the context of a presently preferred embodiment, it will be recognized that a wide variety of implementations may be employed by persons of ordinary skill in the art consistent with the above discussion and the claims which follow below.

I claim:

1. A method of electronic price label self-diagnosis of failures, the method comprising the steps of:
   receiving power from only a battery by an electronic price label;
   periodically performing an unsolicited self-diagnostic test by a processor in the electronic price label;

wirelessly communicating from the electronic price label to a central processor a normal operation signal when the processor of the electronic price label fails to detect a fault during the unsolicited self-diagnostic test; and wirelessly communicating from the electronic price label to the central processor a fault signal identifying a fault when the processor in the electronic price label detects the fault during execution of the unsolicited self diagnostic test.

2. The method of claim 1 further comprising:

periodically transmitting the normal operation signal by the electronic price label to the central processor as long as the electronic price label is capable of transmitting;

receiving the normal operation signal by the central processor as long as the electronic price label is capable of transmitting; and reporting another fault by the central processor when the central processor fails to receive the normal operation signal.

3. The method of claim 1 further comprising:

providing an error indication at the electronic price label when the fault precludes accurate reporting of the fault to the central processor.

4. The method of claim 3 wherein the error indication is an audible tone.

5. An electronic price label comprising;

a battery for providing sole power for powering the electronic price label;

memory for storing diagnostic software for performing a self-diagnostic test;

a communication interface for wirelessly communicating with a host system;

a display for displaying price information; and a processor powered by the battery, wherein the processor periodically performs the self-diagnostic test according to a schedule without first receiving a status request from the host system, wherein the processor furnishes test signals to at least one of the display, communication interface, memory, and battery during the self-diagnostic test, wherein the processor analyzes return signals from the at least one of the display, communication interface, memory, and battery during the self-diagnostic test, wherein the processor determines whether a failure exists in the electronic price label during the self-diagnostic test, and then wirelessly reports said failure to the host system.

6. The electronic price label of claim 5 wherein the processor, when executing the diagnostic software, compares return signals against fault signatures stored in memory.

7. The electronic price label of claim 5 wherein the processor directs the display to identify the reported failure.

8. The electronic price label of claim 5 wherein the processor transmits the reported failure through the communication interface.

9. A method of self-diagnosis of failures in an electronic price label system, the method comprising the steps of:

receiving power from only a battery by each of a plurality of electronic price labels;

periodically performing an unsolicited self-diagnostic test without first receiving a status request from a central processor by each of the electronic price labels;

wirelessly reporting each fault detected by the self-diagnostic test from the electronic price labels to the central processor when the detected fault does not preclude accurate reporting of the fault by the electronic price labels; and providing an error indication when the detected fault precludes accurate reporting of the fault to the central processor by the electronic price labels.

10. The method of claim 1 further comprising:

performing operations by the electronic price label in response to status requests wirelessly received from the central processor.

11. The method of claim 1 wherein the unsolicited self-diagnostic test periodically performed by the processor in the electronic price label further comprises fault isolation to identify the fault exists in a replaceable component.

12. The method of claim 1 wherein the unsolicited self-diagnostic test periodically performed by the processor in the electronic price label further comprises determining if the fault is an easily correctable one.

13. The method of claim 1 wherein the unsolicited self-diagnostic test periodically performed by the processor in the electronic price label comprises identifying an affected component for the fault.

14. The method of claim 1 wherein the unsolicited self-diagnostic test tests the processor, a battery, a display, a memory, a transmitter and a receiver of the electronic price label.

15. The method of claim 1 wherein the unsolicited self-diagnostic test tests for a stuck pushbutton.

16. The method of claim 1 wherein the unsolicited self-diagnostic test further comprises verifying contents of a volatile memory.

17. The method of claim 16 wherein verifying contents of the volatile memory further comprises the electronic price label receiving expected memory contents from the central processor and the processor comparing the contents of the volatile memory with the received expected memory contents.

18. The method of claim 1 wherein the unsolicited self-diagnostic test tests the battery for a low battery condition.

* * * * *